(12) United States Patent
Trappeniers et al.

(10) Patent No.: US 7,913,899 B2
(45) Date of Patent: Mar. 29, 2011

(54) SUPPLYING OBJECT CODE DEFINED INFORMATION TO USERS

(75) Inventors: Lieven Trappeniers, Herentals (BE); Michael Frederik Francois Albert Brackx, Ghent (BE); Zhe Lou, Antwerp (BE); Sigurd Van Broeck, Zoersel (BE); Marc Bruno Frieda Godon, Londerzeel (BE); Johan Georges prosper Criel, Ghent (BE)

(73) Assignee: Alcatel Lucent, Paris (FR)

( * ) Notice: Subject to any disclaimer, the term of this patent is extended or adjusted under 35 U.S.C. 154(b) by 517 days.

(21) Appl. No.: 11/960,692

(22) Filed: Dec. 19, 2007

(65) Prior Publication Data
US 2008/0149702 A1   Jun. 26, 2008

(30) Foreign Application Priority Data
Dec. 22, 2006   (EP) .................................... 06292052

(51) Int. Cl.
*G06F 17/00* (2006.01)
(52) U.S. Cl. ..................................................... 235/375
(58) Field of Classification Search .................. 235/379, 235/380, 383, 492, 375, 79
See application file for complete search history.

(56) References Cited

U.S. PATENT DOCUMENTS

| 6,076,075 A * | 6/2000 | Teicher .......................... 705/41 |
| 7,426,479 B2 * | 9/2008 | Otto ................................ 705/10 |
| 2004/0204063 A1 | 10/2004 | Van Erlach |
| 2006/0231611 A1 * | 10/2006 | Chakiris et al. ............... 235/380 |

FOREIGN PATENT DOCUMENTS

| WO | WO 00/51023 A1 | 8/2000 |
| WO | WO 2006/107610 A2 | 10/2006 |

OTHER PUBLICATIONS

Penttila K et al: "Use and interface definition of mobile RFID reader integrated in a smart phone" Consumer Electronics, 2005, (ISCE 2005), Proceedings of the Ninth International Symposium on Macau SAR Jun. 14-16, 2005, Piscataway, NJ, USA, IEEE, Jun. 14, 2005, pp. 353-358.

* cited by examiner

*Primary Examiner* — Seung H Lee
(74) *Attorney, Agent, or Firm* — Fay Sharpe LLP

(57) ABSTRACT

Object codes such as for example bar codes and other codes from objects such as for example tagged retail goods and other products define first, non-individualized information such as for example audio and/or video commercials etc. to be supplied to destinations (24). To increase a number of possibilities, in response to the object codes, second, individualized information such as for example personal pictures and/or movies etc. is supplied to the destinations (24) in case of being authorized to receive this second, individualized information and otherwise the first, non-individualized information is supplied. Authorized destinations (24) receive the individualized information possibly mixed with some or all non-individualized information, where non-authorized destinations (24) will only receive the non-individualized information.

20 Claims, 3 Drawing Sheets

SUPPLYING OBJECT CODE DEFINED INFORMATION TO USERS

Figure 1:
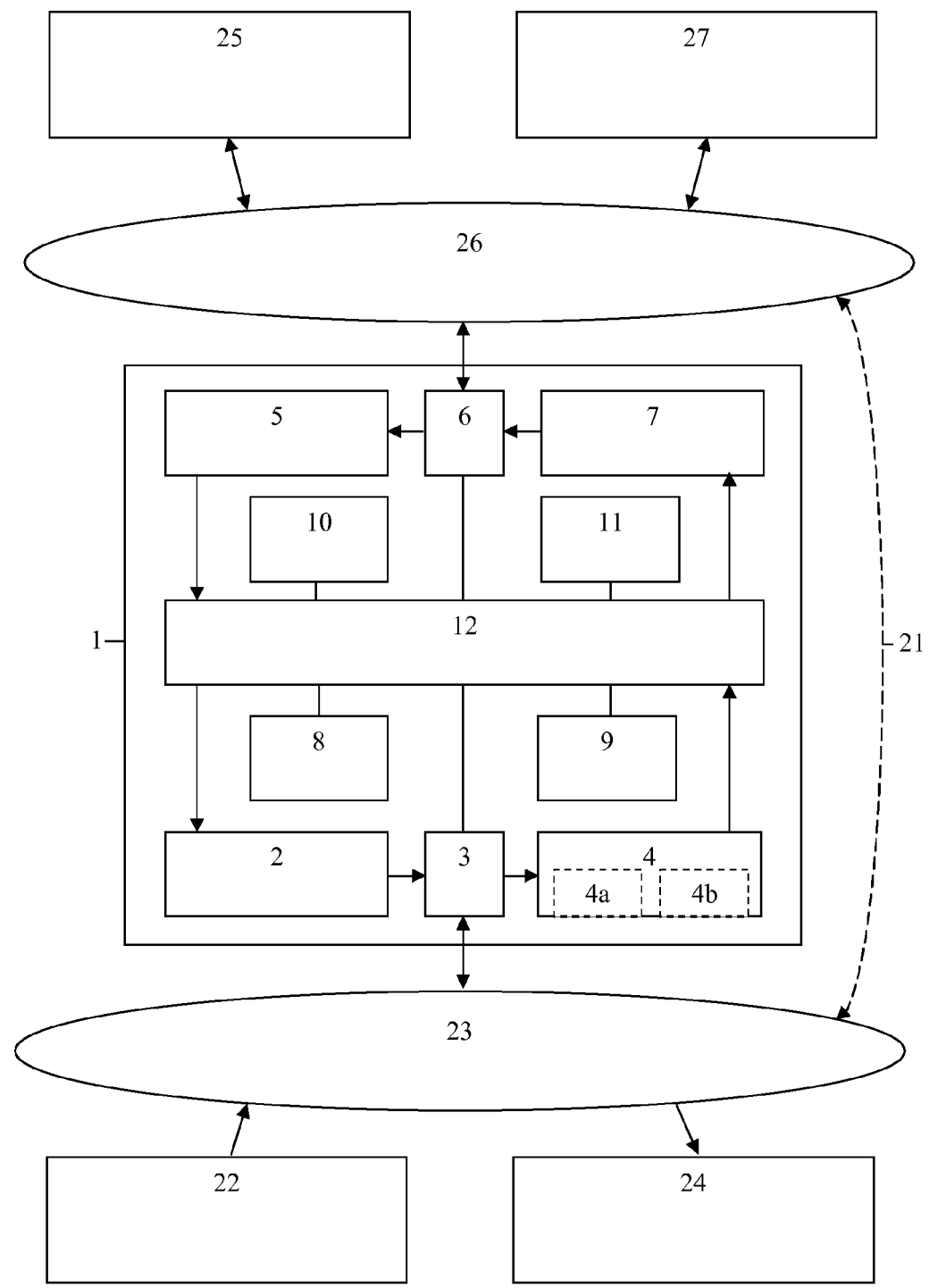

The invention relates to an arrangement for selecting information to be supplied to a destination, which arrangement comprises an object code receiver for receiving an object code originating from an object, which object code defines first information to be supplied to the destination.

Examples of such an object are tagged retail goods and examples of such first information are audio commercials and video commercials.

US 2004/0204063 A1 discloses in general an enhanced telecommunication service and discloses in particular in its paragraph 0028 a "provision of digital product samples according to subscriber criteria and to a wireless device upon reading of a product code".

Usually, an object code receiver receives an object code from an object. Thereto, the object for example comprises a transponder or a passive source or an active source comprising the object code. This object code is for example inputted into the arrangement via an input unit of a device further comprising the arrangement or via an input device of a system further comprising the arrangement. Between the input unit or the input device on the one hand and the arrangement on the other hand, one or more networks may be present or not.

In response to the object code, either the arrangement collects first information from a local storage or a remote storage and transmits the first information to a destination, or the arrangement instructs the local storage or the remote storage to transmit the first information to the destination. At the destination, the first information is for example outputted via an output unit of the device further comprising the arrangement or via an output device of the system further comprising the arrangement. Between the output unit or the output device on the one hand and the arrangement on the other hand, one or more networks may be present or not.

It is an object of the invention, to provide an arrangement as defined in the preamble that offers more possibilities to its users.

The arrangement according to the invention is characterized in that the arrangement further comprises a selector for, in response to the object code, selecting second information to be supplied to the destination in case the destination is authorized to receive the second information and otherwise selecting the first information to be supplied to the destination, which first information is non-individualized information and which second information is individualized information, which non-individualized information and individualized information are at least partly different from each other.

By introducing a selector for, in response to the object code, selecting at least individualized information to be supplied to the destination in case the destination is authorized to receive the individualized information and otherwise selecting only non-individualized information to be supplied to the destination, an authorized destination will receive the individualized information possibly mixed with some or all non-individualized information, where a non-authorized destination will only receive the non-individualized information.

The arrangement according to the invention is further advantageous, in that it makes a process of supplying information to users in response to object codes more interesting to these users. The non-individualized information is for example information provided by a manufacturer or a provider of the object and the individualized information is for example information provided by a first user. A second user (who is authorized or who possesses an input unit or an input device or an output unit or an output device that is authorized) may get the object from the first user and may supply the object code to the arrangement and in return receive the individualized information possibly mixed with some or all non-individualized information. A third user (who is not authorized or who possesses an input unit or an input device or an output unit or an output device that is not authorized) may take the object and may supply the object code to the arrangement but will in return receive only the non-individualized information.

An embodiment of the arrangement according to the invention is characterized in that the arrangement further comprises a further code receiver for receiving a further code from a source, which further code comprises a source code defining the source and/or comprises a destination code defining the destination.

The object code receiver and the further code receiver may for example form part of a request receiver for receiving a request comprising the object code and the further code. The source may be an input unit of a device further comprising the arrangement or may be an input device of a system further comprising the arrangement. The destination may be an output unit of the device further comprising the arrangement or may be an output device of the system further comprising the arrangement. The source and the destination may form part of the same unit or the same device, in which case the source code and the destination code may be identical, or may form part of different units or different devices, in which case the source code and the destination code may not be identical.

An embodiment of the arrangement according to the invention is characterized in that the arrangement further comprises a controller for controlling the selector for making a selection of the non-individualized information or the individualized information dependent on a parameter.

The parameter may be a time parameter, a date parameter, a location parameter and a cost parameter, without having excluded further parameters. Via these parameters, the individualized information can for example be made available in dependence of the time, the date, the location (of the object and/or of the source and/or of the destination) and the costs (of the object and/or for the source and/or for the destination).

An embodiment of the arrangement according to the invention is characterized in that the arrangement further comprises an order transmitter for transmitting a first order to a first storage unit, which first storage unit is arranged to store the non-individualized information, which first order comprises a first information code defining the non-individualized information, and for transmitting a second order to a second storage unit, which second storage unit is arranged to store the individualized information, which second order comprises a second information code defining the individualized information.

The first information code may be identical to the object code, or may be at least partly different from the object code, in which case the arrangement may need a converter for converting the object code into the first information code. The second information code may be identical to the object code, in which case the second storage unit may need to be able to link the object code to the individualized information. Alternatively, the second information code may be at least partly different from the object code, in which case the arrangement may need a converter for converting the object code into the second information code. The second information code may be identical to the source code and/or the destination code, in which case the arrangement may need to be able to link the source code and/or the destination code to the individualized information. Alternatively, the second information code may be at least partly different from the source code and/or the destination code, in which case the arrangement may need a converter for converting the source code and/or the destination code into the second information code.

The invention also relates to a device comprising the arrangement as defined above, which device is characterized in that the device further comprises an input unit for inputting the object code and/or comprises an output unit for outputting the non-individualized information or the individualized information.

The invention also relates to a system comprising the arrangement as defined above, which system is characterized in that the system further comprises a second storage unit for storing the individualized information and/or comprises an input device for inputting the object code and/or comprises an output device for outputting the non-individualized information or the individualized information.

The invention also relates to a method for selecting information to be supplied to a destination, which method comprises a step of receiving an object code originating from an object, which object code defines first information to be supplied to the destination, which method is characterized in that the method further comprises a step of, in response to the object code, selecting second information to be supplied to the destination in case the destination is authorized to receive the second information and otherwise selecting the first information to be supplied to the destination, which first information is non-individualized information and which second information is individualized information, which non-individualized information and individualized information are at least partly different from each other.

An embodiment of the method according to the invention is characterized in that the method further comprises a step of receiving a further code from a source, which further code comprises a source code defining the source and/or comprises a destination code defining the destination and/or comprises a step of controlling the selecting for making a selection of the non-individualized information or the individualized information dependent on a parameter and/or comprises a step of transmitting a first order to a first storage unit, which first storage unit is arranged to store the non-individualized information, which first order comprises a first information code defining the non-individualized information, and of transmitting a second order to a second storage unit, which second storage unit is arranged to store the individualized information, which second order comprises a second information code defining the individualized information.

The invention also relates to a computer program product for performing the steps of the method as defined above.

The invention also relates to a medium for storing and comprising the computer program product as defined above.

The invention is based upon an insight, that an individualized arrangement offers more possibilities to its users, and is based upon a basic idea, that an authorization dependent selection of (non)individualized information is to be introduced and/or used.

The invention solves a problem, to provide an arrangement that offers more possibilities to its users, and is further advantageous, in that it makes a process of supplying information to users in response to object codes more interesting to these users.

These and other aspects of the invention will be apparent from and elucidated with reference to the embodiments(s) described hereinafter.

Figure 2:
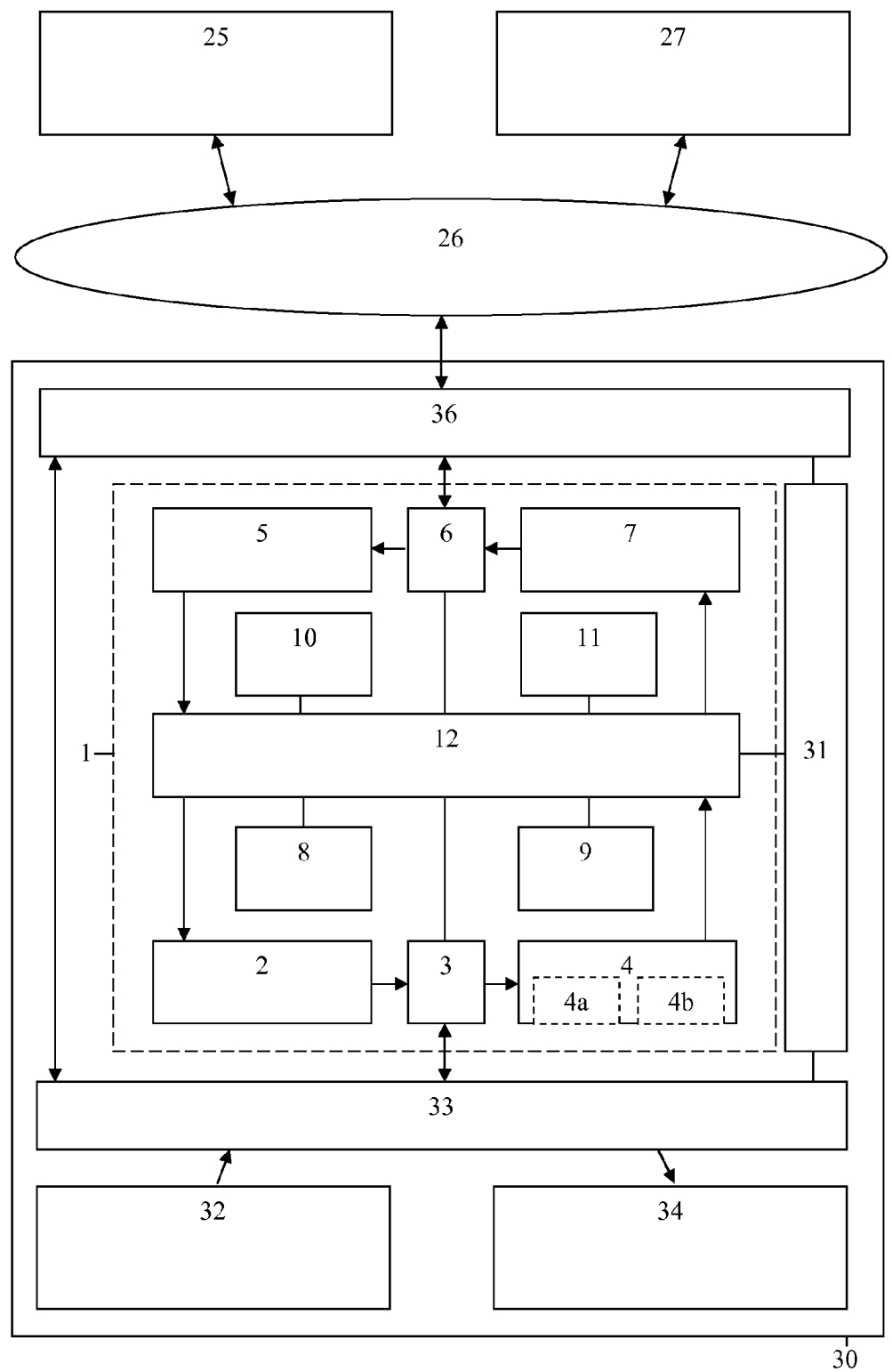
Figure 3:
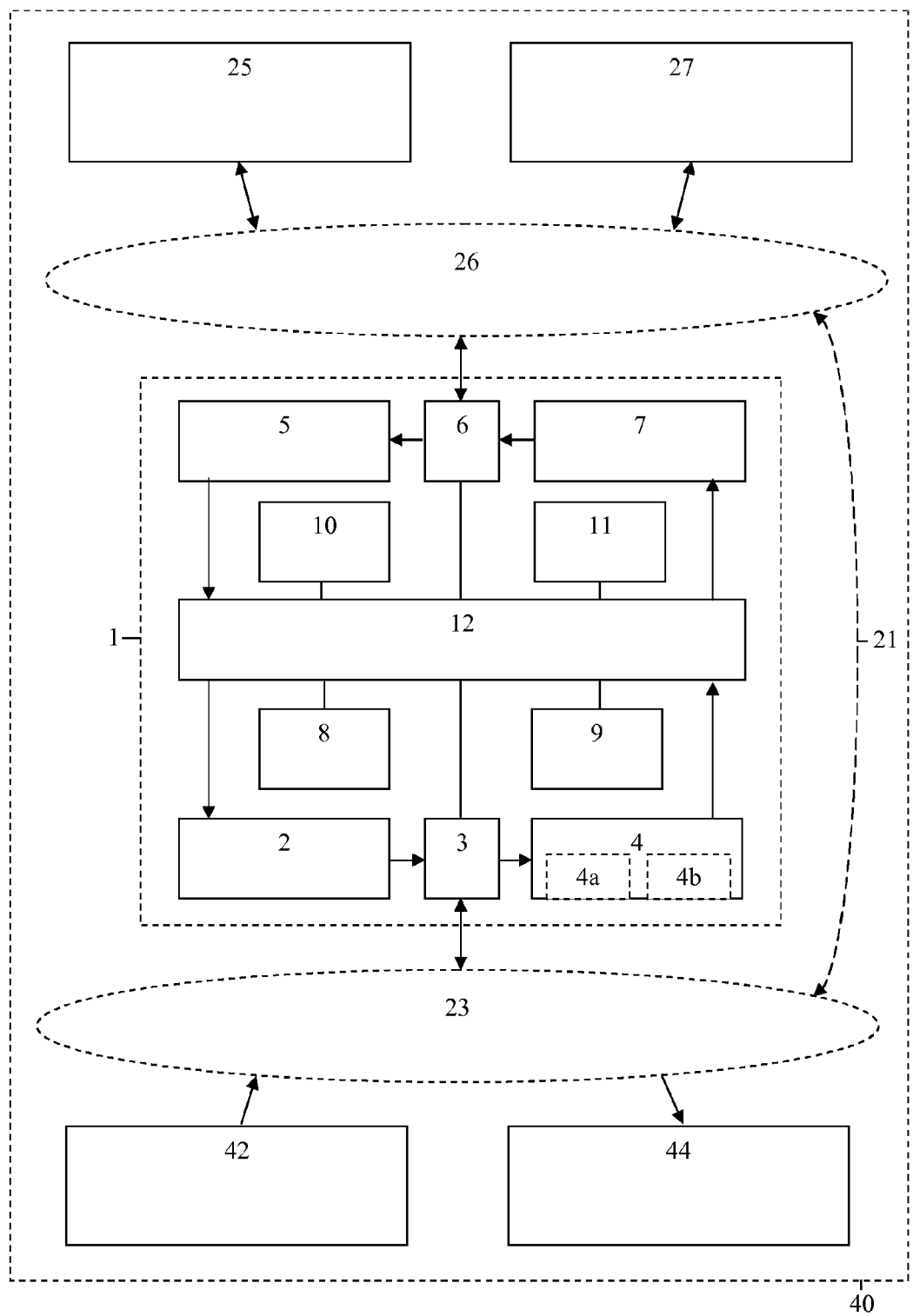

FIG. 1 shows diagrammatically an arrangement according to the invention coupled to a source and to a destination and to a first storage unit and to a second storage unit, FIG. 2 shows diagrammatically a device according to the invention comprising an arrangement according to the invention and an input unit and an output unit and coupled to a first storage unit and to a second storage unit, and FIG. 3 shows diagrammatically a system according to the invention comprising an arrangement according to the invention and an input device and an output device.

The arrangement 1 shown in the FIG. 1 comprises a request receiver 4 with an input coupled to an output of a first interface 3 and with an output coupled to a first input of a switch 12. The request receiver 4 for example comprises an object code receiver 4a and a further code receiver 4b. The arrangement 1 further comprises an order transmitter 7 with an input coupled to a first output of the switch 12 and with an output coupled to an input of a second interface 6. An output of the second interface 6 is coupled to an input of a further receiver 5 that has an output coupled to a second input of the switch 12. An input of the first interface 3 is coupled to an output of a further transmitter 2 that has an input coupled to a second output of the switch 12. The arrangement 1 further comprises a selector 9 with an in/output coupled to a first in/output of the switch 12 and a controller 8 with an in/output coupled to a second in/output of the switch 12. An in/output of a memory 10 is coupled to a third in/output of the switch 12, and an in/output of a man machine interface 11 or mmi 11 is coupled to a fourth in/output of the switch 12.

An in/output of the first interface 3 is coupled to a source 22 and to a destination 24 possibly via a network 23, and an in/output of the second interface 6 is coupled to a first storage unit 25 and to a second storage unit 27 possibly via a network 26. The networks 23 and 26 may for part of one network or may be different networks coupled to each other via a link 21. The source 22 and the destination 24 may form part of one physical entity or may form part of different physical entities at one location or at different locations. The storage units 25 and 27 may form part of one physical entity or may form part of different physical entities at one location or at different locations. The interfaces 3 and 6 are further coupled to the switch 12 for control and/or information purposes. Instead of a switch 12, a bus may be used. Instead of a switch and/or a bus, the selector 9 may be located at the central position, with or without additional switch functions and/or bus functions, or the controller 8 may be located at the central position, with or without additional switch and/or bus functions.

In a prior art situation, a user who has bought an object such as for example a bottle with a bar code places the bottle in a vicinity of a source 22 such as for example a set top box with a bar code reader. The set top box sends the bar code via the arrangement 1 to a first storage unit 25 that in response sends first information such as for example an audio commercial or a video commercial to a destination 24 such as for example an audio receiver or a video receiver, via the arrangement 1 (read: via the further receiver 5 and the further transmitter 2) or not. As a result, the user can hear or see the commercial. So, the arrangement 1 selects information to be supplied to the destination 24, which arrangement 1 comprises the object code receiver 4a for receiving the object code originating from the object, which object code defines the first information stored in the first storage unit 25 to be supplied to the destination 24.

According to the invention, to offer more possibilities to its users, the arrangement 1 is provided with a selector 9 for, in response to the object code, selecting second information stored in the second storage unit 27 to be supplied to the destination 24 in case the destination 24 is authorized to receive the second information. Otherwise the selector 9 will select the first information stored in the first storage unit 25 to be supplied to the destination 24. The first information is non-individualized information and the second information is individualized information, which non-individualized information and individualized information are at least partly different from each other. This way, an authorized destination will receive the individualized information possibly mixed with some or all non-individualized information, where a non-authorized destination will only receive the non-individualized information. The non-individualized information and/or the individualized information may be sent from the storage units 25 and/or 27 to the destination 24 via the arrangement 1 or via the link 21 or via a way not shown.

The non-individualized information such as a commercial is for example information provided by a manufacturer or a provider of the object and the individualized information such as personal pictures and/or movies is for example information provided by a first user. A second user (who is authorized or who possesses a source 22 or a destination 24 that is authorized) may get the object from the first user and may supply the object code to the arrangement 1 and in return receive the individualized information possibly mixed with some or all non-individualized information. A third user (who is not authorized or who possesses a source 22 or a destination 24 that is not authorized) may take the object and may supply the object code to the arrangement 1 but will in return receive only the non-individualized information.

So, the first user may inform the arrangement which second users and/or which further sources and/or which further destinations are authorized to receive the individualized information in response to the object code and where this individualized information is to be found. This informing may be done through phone, fax, email, or via a data communication from the source and/or the destination to the arrangement or via a data communication from a storage unit that stores this individualized information to the arrangement etc. The first user may have a direct control over this storage unit that may be located close to the source and/or the destination of the first user or form part of the source and/or the destination of the first user or not. In the latter case, the first user may supply the individualized information to a storage provider etc. Alternatively, the arrangement may get all authorization and location information from a database etc.

According to one out of many possible realizations, the arrangement 1 is further provided with the further code receiver 4b for receiving a further code from the source 22, which further code comprises a source code defining the source 22 and/or comprises a destination code defining the destination 24. The object code receiver 4a and the further code receiver 4b may for example form part of the request receiver 4 for receiving a request comprising the object code and the further code. The source 22 may be an input unit of a device further comprising the arrangement 1 as shown in the FIG. 2 or may be an input device of a system further comprising the arrangement 1 as shown in the FIG. 3. The destination 24 may be an output unit of the device further comprising the arrangement 1 as shown in the FIG. 2 or may be an output device of the system further comprising the arrangement 1 as shown in the FIG. 3. The source 22 and the destination 24 may form part of the same unit or the same device, in which case the source code and the destination code may be identical, or may form part of different units or different devices, in which case the source code and the destination code may not be identical.

The source code allows the arrangement 1 to check an authority of the source 22 and/or allows the arrangement 1 to find out the destination by converting the source code into the destination code via for example a converter (the controller 8) or a table (the memory 10) whereby an authority of the source 22 may be an indication for the authority of the destination 24 or whereby the destination code itself may be an indication for an authority of the destination 24. The destination code allows the arrangement 1 to check an authority of the destination 22.

According to one out of many possible realizations, the arrangement 1 is further provided with the controller 8 for controlling the selector 9 for making a selection of the non-individualized information or the individualized information dependent on a parameter. The parameter may be a time parameter, a date parameter, a location parameter and a cost parameter, without having excluded further parameters. Via these parameters, the individualized information can for example be made available in dependence of the time, the date, the location (of the object and/or of the source 22 and/or of the destination 24) and the costs (of the object and/or for the source 22 and/or for the destination 24).

According to one out of many possible realizations, the arrangement 1 is further provided with the order transmitter 7 for transmitting a first order to a first storage unit 25 that stores the non-individualized information, which first order comprises a first information code defining the non-individualized information, and for transmitting a second order to a second storage unit 27 that stores the individualized information, which second order comprises a second information code defining the individualized information. The first information code may be identical to the object code, or may be at least partly different from the object code, in which case the arrangement 1 may need a converter (the controller 8) for converting the object code into the first information code. The second information code may be identical to the object code, in which case the second storage unit 27 may need to be able to link the object code to the individualized information. Alternatively, the second information code may be at least partly different from the object code, in which case the arrangement 1 may need a converter (the controller 8) for converting the object code into the second information code. The second information code may be identical to the source code and/or the destination code, in which case the second storage unit 27 may need to be able to link the source code and/or the destination code to the individualized information. Alternatively, the second information code may be at least partly different from the source code and/or the destination code, in which case the arrangement 1 may need a converter (the controller 8) for converting the source code and/or the destination code into the second information code.

The device 30 according to the invention shown in the FIG. 2 comprises the arrangement 1 according to the invention and an input unit 32 and an output unit 34 both coupled via a third interface 33 to the first interface 3. The device 30 further comprises a fourth interface 36 coupled to the second interface 6 and coupled to the storage units 25 and 27 possibly via the network 26. The third and fourth interfaces 33 and 36 are coupled to each other via a processor 31 that is further coupled to the switch 12. The input unit 32 takes the place of the source 22 of the FIG. 1 and the output unit 34 takes the place of the destination 24 of the FIG. 1.

The system 40 according to the invention shown in the FIG. 3 comprises the arrangement 1 according to the invention and an input device 42 and an output device 44 both coupled to the first interface 3 possibly via the network 23. The second interface 6 is coupled to the storage units 25 and 27 possibly via the network 26, whereby the second storage unit 27 will form part of the system 40 and whereby the first storage unit 25 may form part of the system 40 or not. The input device 42 takes the place of the source 22 of the FIG. 1 and the output device 44 takes the place of the destination 24 of the FIG. 1.

The source 22, the input unit 32 (a bar code reader, a transceiver, a receiver, a pc etc.) and the input device 42 (a set top box, an audio receiver, a video receiver, a mobile phone, a pc etc. each with a bar code reader, a transceiver, a receiver etc.) may be any kind of wired and/or wireless apparatus capable of receiving an object code in a wired and/or wireless way and capable of supplying the object code to the arrangement 1 in a wired and/or wireless way. The product may be any kind of product capable of carrying an object code. The object code may be stored in and/or on the object via a transponder or a passive source or an active source. In case of the object code being available in the form of a bar code, the source 22 and the input device 42 may need a bar code reader. In case of the object code being available via a transponder, the source 22 and the input device 42 may need a transceiver. In case of the object code being available via a transmitter fed by a battery or a solar cell, the source 22 and the input device 42 may need a receiver etc. The object code may be an optical code or an acoustical code or a data code such as a uniform resource locator, a digital sound module, an identification etc.

The destination 24, the output unit 32 (a display, a loudspeaker, a pc etc.) and the output device 44 (an audio receiver, a video receiver, a mobile phone, a pc etc.) may be any kind of wired and/or wireless apparatus capable of receiving first and second information in a wired and/or wireless way and capable of rendering the first and second information. The non-individualized information may be any kind of audio and/or video information such as commercials, newsletters, background information etc. and the individualized information may be any kind of audio and/or video information such as personal songs, personal pictures etc. The arrangement 1 may be realized in many different ways through different pieces of hardware and/or different pieces of software and/or integrated hardware and/or integrated software etc.

In other words, a tangible media concept is inspired by a consumer's desire to make the television experience more flexible. The tangible media concept offers this flexibility by attaching multimedia to objects, which enables the end users to experience a seamless connection between the physical and the digital world. More concretely, people are able to instantaneous access content by putting the objects in front of their television. Systems are known in which an RFID reader is added to the IPTV set-top box. This reader senses the proximity of a token. When a certain token is sensed, the related content is launched on the STB (either from a local repository or from a network). The digital information sent from the token to the STB and to a multimedia delivery platform can be an ID, a URL or a DRM certificate for the content. Examples are known for movie trailers, movies and advertisement.

These known systems have the following shortcomings: The object/token has a fixed association to a multimedia item, and there is no user control. The associated multimedia item is determined by business actors (content owners, advertisement agencies, . . . ).

The basic idea is to enable the dynamic association of a second, other, content to a fixed token corresponding to a certain object. Based on a policy consisting of a set of rules it is determined which content is accessible from where and by whom. In this way it is enabled to additionally couple a user's personal content to a certain object so that at reading of a token that corresponds to the object the personal content can be retrieved. The invention solves the above shortcomings by: Introducing a dynamic association of tokens to content (by the user, by business actors (content owners, advertisement agencies, . . . ) and/or controlled by policies and charging mechanisms), allowing the users to re-purpose commercial tangible objects for their own tangible media content (e.g. a bottle of Ouzo now results in the launch of a holiday slideshow on TV instead of a commercial) and associate valuable items (souvenirs) to personal content, and allowing the operators to: Charge B2B actors (content owners, advertisement agencies, . . . ) for every time an item is shown to a user, charge users for re-purposing commercial items (the bottle of Ouzo) and apply flexible policies and charging schemes on the above actions.

A user scenario might be as follows. A first user has bought a bottle of Ouzo on a holiday in Greece. At home, the first user puts the bottle close to the TV set. As a result, a commercial for this brand of Ouzo is launched on the TV set. The first user then selects a holiday picture slideshow already stored or to be stored. From that moment, every time the first user puts this unique bottle of Ouzo on front of the TV set, the holiday pictures are shown. Later that day, the first user gives the bottle of Ouzo to a second user. When the second user puts the bottle of Ouzo in front of a second user's TV set, the first user's slideshow is launched on the second user's TV set. Indeed, the first user has created a policy that all friends are allowed to view the first user's personal content via this bottle. If someone else would touch another TV set with the bottle, the original Ouzo commercial would be shown.

So, the invention introduces a dynamic association of tokens to content (by the user, by business actors (content owners, advertisement agencies, . . . ), controlled by policies and charging mechanisms), allowing the users to re-purpose commercial tangible objects for their own tangible media content (e.g. a bottle of Ouzo now results in the launch of a holiday slideshow on TV instead of a commercial) and to associate valuable items (souvenirs) to personal content, allowing the operators to charge B2B actors (content owners, advertisement agencies, . . . ) for every time an item is shown to a user and to charge users for re-purposing commercial items (the bottle of Ouzo) (e.g. charge a fee for associating personal content to the bottle of Ouzo i.e. "for not showing the advertisement") and to apply flexible policies and charging schemes on the above actions (if you watch the commercial 5 times, you can re-purpose the item for your own content, re-purpose a souvenir but still get interactive "sponsoring" by the Greek tourist office) and to be an active broker between user and B2B actor (monetize the conflicting interests (direct marketing versus personal content) through flexible policies linked to rating and charging schemes).

The invention comprises for example a network server, a database and a B2B interface. The network server (called "Token-Content Correlator" or TCC) then interacts with the tangible media System and the (IPTV) multimedia content delivery system to initiate a multimedia event. Some functional blocks that may be used are an RFID reader, when an RFID token is placed in the vicinity of the reader, the reader sends the info on this event to the tangible media system (TMS) using an interface. A reader could be either a fixed reader at home, a mobile phone, any IP-based reader, . . .

a Tangible Media System (TMS) receives notifications on which token is placed near which reader (in the form {reader_ID, token_data}). The TMS uses the TCC to resolve the token_data to a multimedia item. The TMS triggers the IPTV MultiMedia Delivery Platform to display the content on the proper set-top-box.

(IPTV) Multimedia Delivery Platform: stores pre-provisioned multimedia content and can launch this content on a specified set-top-box (cfr. Video-on-Demand).

a Token Content Correlator (TCC) correlates token_data to a multimedia item(s). The TCC allows to associate multiple media items to a unique token based on policies: who, when, where, . . . The TCC and TMS have a link to the operator's rating and billing infrastructure.

A more detailed scenario could be as follows. A first user has bought a bottle of Ouzo on a holiday in Greece. The Ouzo brand already is using Tangible Media for its advertisement and has provisioned the IPTV operators. At home, the first user puts the bottle close to a TV set that sends the bottles data (as embedded in the token) to the Tangible Media System (TMS). The TMS queries the Token-Content Correlator (TCC) that matches the token_data to the Ouzo commercial. With that knowledge, the TMS then instructs the IPTV MultiMedia Delivery System to launch the Ouzo movie on the STB of the first user.

In a next step, with the bottle of Ouzo still next to the TV set, the first user uses for example a remote control to select a holiday picture slideshow and presses OK. The set top box sends the reference to the slideshow to the TCC, together with the token_data of the bottle of Ouzo. The result is that the database of the TCC has two entries for this unique bottle of Ouzo; one to the commercial and one to the personal content of the first user.

From that moment, every time the first user puts this unique bottle of Ouzo in front of the TV set, the holiday pictures are shown. Indeed, the STB sends the token_data to the TMS that queries the TCC. The TCC's database contains a dedicated entry for this bottle of Ouzo and the first user. The TCC returns to the TMS a reference to the personal content of the first user. The TMS instructs the IPTV Multimedia delivery platform to play the slideshow on the first user's TV.

Later that day, the first user gives the bottle of Ouzo to a second user. When the second user puts the bottle of Ouzo in front of the second user's TV set, the first user's slideshow is launched on this TV set. Indeed, the first user has created a policy that all friends are allowed to view this personal content via this bottle. If someone else would touch his TV set with the bottle, the original Ouzo commercial would be shown. The digital data read by the (RFID) reader from the bottle of Ouzo could be a unique ID, a URL, a certificate, DRM rights, . . . Depending on the nature of these data (and the nature of the application), somewhere in the workflow a translation needs to be done to the abstraction level of a typical Multimedia Content Delivery Platform (like IPTV). The invention also allows (increasing the business potential even more) the B2B actor (advertising agency, . . . ) to keep its content up to date (ie. an old coca-cola bottle could launch a new commercial) and target users (and groups) directly by adding specific rules and filters in the TCC database.

The solution is relevant for the following application domains: New content-delivery mechanism (and the position of the operator therein), (tangible) direct marketing & advertisement and user centric multimedia sharing.

In the FIG. 1-3, each coupling/connection may be a wired coupling/connection or a wireless coupling/connection and may comprise sub-couplings/sub-connections and/or units not shown. Any block shown may be divided into sub-blocks, and any two or more blocks may be integrated into a new and larger block. Any block shown may comprise hardware and/or software. The computer program product according to the invention may be stored on a fixed medium or a removable medium.

The expression "for" in for example "for selecting" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude a possible presence of one or more pluralities.

The steps and/or functions of selecting etc. do not exclude further steps and/or functions, like for example, inter alia, the steps and/or functions described for the Figures etc.

The invention claimed is:

1. An apparatus (1) for selecting information to be supplied to a destination (24), which apparatus (1) comprises:
    an object code receiver (4a) for receiving an object code originating from an object, which object code defines first information to be supplied to a destination; and
    a selector (9) for, in response to the object code, selecting second information to be supplied to the destination (24) in the case the destination (24) is authorized to receive the second information and otherwise selecting the first information to be supplied to the destination (24), which first information is non-individualized information and which second information is individualized information, which non-individualized information and individualized information are at least partly different from each other.

2. The apparatus (1) as defined in claim 1, characterized in that the arrangement (1) further comprises a further code receiver (4b) for receiving a further code from a source (22), which further code comprises a source code defining the source (22) or a destination code defining the destination (24).

3. The apparatus (1) as defined in claim 1, characterized in that the arrangement (1) further comprises a controller (8) for controlling the selector (9) for making a selection of the non-individualized information or the individualized information dependent on a parameter.

4. The apparatus (1) as defined in claim 1, characterized in that the arrangement (1) further comprises an order transmitter (7) for transmitting a first order to a first storage unit (25), which first storage unit (25) is arranged to store the non-individualized information, which first order comprises a first information code defining the non-individualized information, and for transmitting a second order to a second storage unit (27), which second storage unit (27) is arranged to store the individualized information, which second order comprises a second information code defining the individualized information.

5. The apparatus (1) as defined in claim 1, characterized in that the apparatus further comprises:
    a device having at least one of an input unit for inputting the object code and an output unit for outputting the non-individualized information or the individualized information.

6. The apparatus (1) as defined in claim 1 wherein the non-individualized information is at least one of audio information and video information.

7. The apparatus (1) as defined in claim 6 wherein the individualized information is at least one of audio information and video information.

8. A system comprising:
    an object code receiver for receiving an object code originating from an object, which object code defines first information to be supplied to a destination;
    a selector for, in response to the object code, selecting second information to be supplied to the destination in the case the destination is authorized to receive the second information and otherwise selecting the first information to be supplied to the destination, which first information is non-individualized information and which second information is individualized information, which non-individualized information and individualized information are at least partly different from each other; and at least one of a second storage unit for storing the individualized information and an input device for inputting the object code and an output device for outputting the non-individualized information or the individualized information.

9. The system defined in claim 8 further comprising a further code receiver for receiving a further code from a source, which further code includes at least one of a source code defining the source and a destination code defining the destination.

10. The system defined in claim 8 further comprising a controller for controlling the selector for making a selection of the non-individualized information or the individualized information dependent on a parameter.

11. The system defined in claim 10 further comprising an order transmitter adapted to transmit a first order to a first storage unit arranged to store the non-individualized information, wherein the first order further includes a first information code defining the non-individualized information, the order transmitter adapted to transmit a second order to a second storage unit arranged to store the individualized information, wherein the second order includes a second information code defining the individualized information.

12. The system defined in claim 10 further comprising an input unit for inputting the object code an output unit for outputting at least one of the non-individualized information and the individualized information.

13. The system as defined in claim 12 wherein the non-individualized information is at least one of audio information and video information.

14. The system as defined in claim 12 wherein the individualized information is at least one of audio information and video information.

15. A method for selecting information to be supplied to a destination (24), which method comprises a step of receiving an object code originating from an object, which object code defines first information to be supplied to the destination (24), characterized in that the method further comprises a step of, in response to the object code, selecting second information to be supplied to the destination (24) in case the destination (24) is authorized to receive the second information and otherwise selecting the first information to be supplied to the destination (24), which first information is non-individualized information and which second information is individualized information, which non-individualized information and individualized information are at least partly different from each other.

16. The method as defined in claim 15, characterized in that the method further comprises:

receiving a further code from a source (22), which further code includes at least one of a source code defining the source (22) and a destination code defining the destination (24)

a step of controlling the selecting for making a selection of the non-individualized information or the individualized in formation dependent on a parameter;

transmitting a first order to a first storage unit (25), which first storage unit (25) is arranged to store the non-individualized information, which first order comprises a first information code defining the non-individualized in formation; and transmitting a second order to a second storage unit (27), which second storage unit (27) is arranged to store the individualized information, which second order comprises a second in formation code defining the individualized information.

17. A computer program product for performing the steps of the method as defined in claim 15.

18. A medium for storing and comprising the computer program product as defined in the claim 17.

19. The method as defined in claim 15 wherein the non-individualized information is at least one of audio information and video information.

20. The method as defined in claim 19 wherein the individualized information is at least one of audio information and video information.

* * * * *